No. 748,829. Patented January 5, 1904.

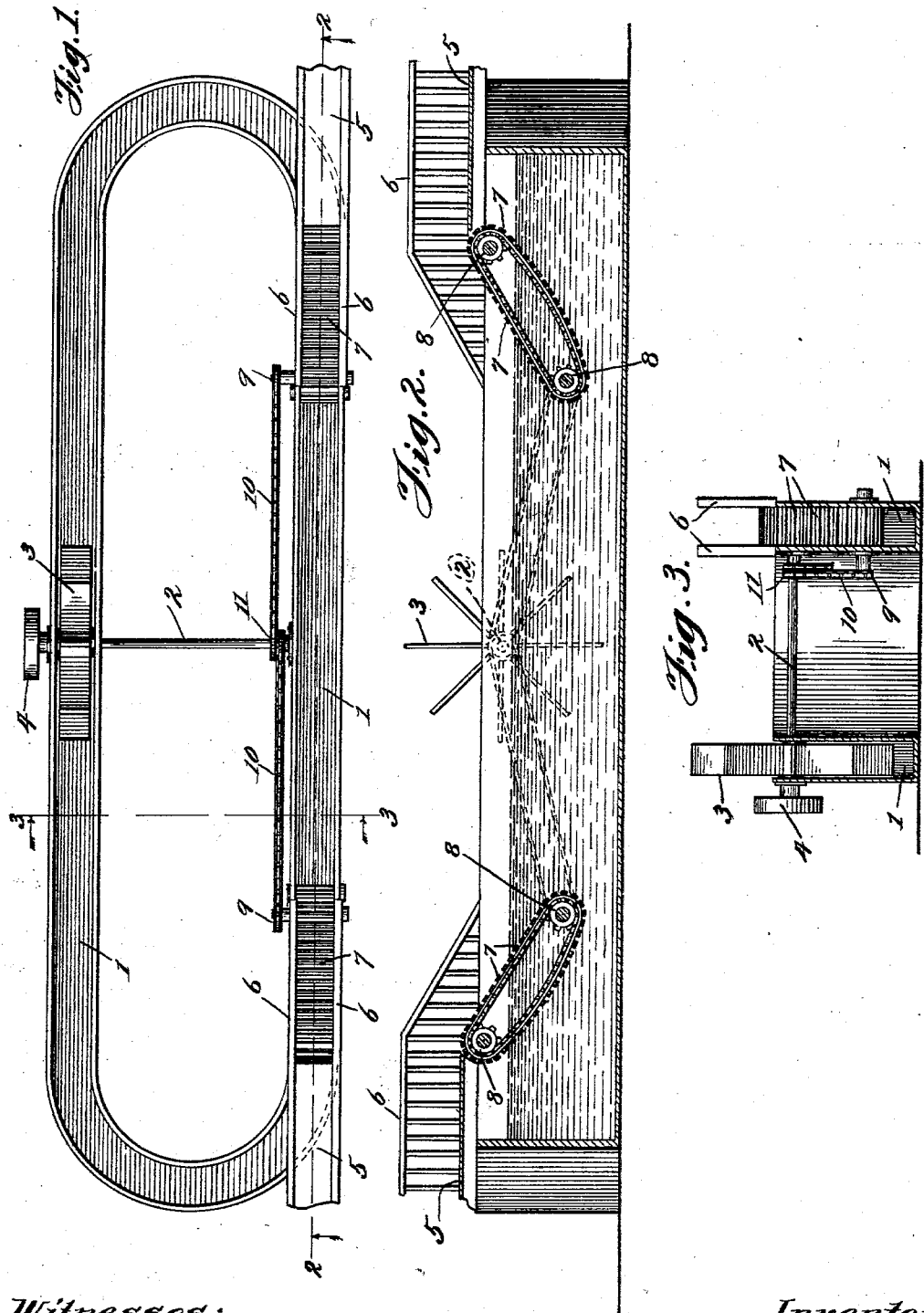

UNITED STATES PATENT OFFICE.

RALPH J. WINNIE, OF CHICAGO, ILLINOIS, ASSIGNOR OF ONE-THIRD TO DAVID LYONS, OF CHICAGO, ILLINOIS.

MACHINE FOR DIPPING SHEEP.

SPECIFICATION forming part of Letters Patent No. 748,829, dated January 5, 1904.

Application filed December 13, 1902. Serial No. 135,079. (No model.)

*To all whom it may concern:*

Be it known that I, RALPH J. WINNIE, a citizen of the United States, residing at Chicago, in the county of Cook and State of Illinois, have invented a certain new and useful Improvement in Machines for Dipping Sheep, of which the following is a full, clear, concise, and exact description, reference being had to the accompanying drawings, forming a part of this specification.

My invention relates to improvements in machines for dipping sheep.

Before shearing the wool from sheep it is usual to dip them in a disinfecting solution for the purpose of killing lice, ticks, scab, germs, &c., which might be on the skin or in the wool. This has heretofore been done by immersing the sheep in a disinfecting solution which was contained in a trough or elongated tub. Once in the solution the sheep generally would endeavor to swim or float, and they would be moved toward the end of the trough opposite the end where they first entered the solution by a number of men who stood alongside the trough and pushed the sheep with forked poles or rods. When the sheep reached the opposite end of the trough, they would either climb out of the trough or be pulled therefrom. It often happened, however, that a sheep was unable or refused to swim, and therefore drowned before it could be removed. In consequence of the drowning of a sheep the trough was blocked to the passage of other sheep until such drowned sheep was removed. From one to two per cent. of the sheep dipped were drowned, and the interruption in the work by the drowning of a sheep occasioned considerable loss of time. Then, again, many of the sheep dipped were wounded by the poles with which they were pushed through the solution and these wounds occasionally resulted in permanent injury or in death.

My invention has been devised for the purpose of overcoming the objections above pointed out and to greatly lessen the number of men required in dipping the sheep.

The invention provides for the immersion of the sheep in the solution, their movement through the trough, and finally their removal from the solution, all substantially without the aid of an attendant.

The invention consists of the combination, construction, and arrangement of parts, as hereinafter described, and more particularly pointed out in the claims.

In the accompanying drawings, Figure 1 is a plan view of my improved machine. Fig. 2 is a side view thereof with a part of the trough broken away to disclose the carriers and their arrangement, and Fig. 3 is a cross-section on the line 3 3 of Fig. 1.

The drawings show the preferred manner of carrying out my invention. Therein is represented a circuitous trough 1 to contain a disinfecting solution in which to immerse the sheep. Upon a shaft 2, which is suitably journaled, is mounted a propeller-wheel 3, having its blades projecting into the trough. Said propeller-wheel is to force the solution to flow around the trough and may be rotated by any desirable motive power, preferably belted to a pulley 4, keyed upon the shaft 2.

Two platforms 5 are provided and each has one of its ends arranged over the solution within the trough. Over one of the platforms the sheep are driven to the trough and by the other they leave the same. A railing 6 is preferably provided on each side of said platforms to keep the sheep from jumping off.

From the end of each platform, which is above the solution, extends, preferably, an endless carrier, which, preferably, is inclined and has its lower end submerged in the solution. Each carrier consists, preferably, of a belt composed of a number of parallel transverse slats, which are separated one from the other and flexibly connected to each other in any suitable manner. This belt passes around rollers 8, which are journaled in any desirable manner, and connected to one of the rollers of each carrier is a sprocket-wheel 9, to which power is transmitted by a chain 10 from a sprocket 11 on the driving-shaft 2.

By thus arranging both of the carriers and the propeller they are all adapted to be driven by the main shaft.

The carriers are so operated by the driving-shaft that they move in opposite directions, and the propeller-wheel causes the solution to flow from the carrier moving downwardly to the carrier moving upwardly. The sheep are driven along the platform, having at its end the carrier which moves downwardly. When they reach said carrier, they are carried thereby into the solution. As soon as said sheep are immersed in the solution they will usually endeavor to float or swim. The current of the solution will move them toward the carrier moving upward. When they reach this carrier it will remove them from the solution and convey them to the platform over which they pass away from the trough.

Although not essential, it is preferable to have the lower ends of the carriers extending beneath the surface of the solution, as shown. It is especially desirable to have the carrier for removing the sheep arranged in this manner, so that there will be no danger of the sheep being carried beneath said carrier by the current, and then, too, with this arrangement as soon as the sheep reach the carrier they will be quickly removed from the solution without their having to climb out, as would be necessary if the end of the carrier were not submerged.

A sufficient space is preferably left beneath the lower ends of the carriers and the bottom of the trough to permit the current to freely flow thereunder. Of course the current may flow between the slats of the carriers; but said slats will somewhat retard the movement of the solution. By reason thus of the current moving faster at the bottom than at the top there will be a tendency of the current while yet moving around the trough to also move upwardly between the two carriers. This will prevent the sinking of any of the sheep should they be unable or refuse to swim.

My invention does away with the number of men heretofore required in dipping the sheep. In using my improvement it is only necessary to drive the sheep to the carrier which moves downwardly. This carrier will immerse the sheep in the solution, and the current will move them to the other carrier, which will remove them. A greater number of sheep may be dipped by my machine than was possible by the old method, and, furthermore, the operation may be accomplished with more facility. In addition thereto the drowning of sheep will not occur any more, and therefore the delay occasioned in the dipping of the sheep in consequence of the drowning of a sheep will no longer exist.

I am aware that certain changes in the details of construction and the arrangement of parts as herein disclosed may be made, and I therefore reserve the right to make such modifications as fairly fall within the scope of my invention.

What I claim, and desire to secure by Letters Patent, is—

1. In a device for dipping sheep, the combination with a trough for a disinfecting solution, of oppositely-disposed conveyers separated from each other, and means for moving said conveyers in reverse directions.

2. In a device for dipping sheep, the combination with a trough for a disinfecting solution, of means for forcing said solution through said trough, oppositely-disposed conveyers separated from each other, and means for moving said conveyers in reverse directions.

3. In a device for dipping sheep, the combination with a trough for a disinfecting solution, of a propeller-wheel arranged in said trough for forcing said solution through the trough, oppositely-disposed conveyers separated from each other, and means for moving said conveyers in reverse directions.

4. In a device for dipping sheep, the combination with a circuitous trough for a disinfecting solution, of oppositely-disposed conveyers separated from each other, and means for moving said conveyers in reverse directions.

5. In a device for dipping sheep, the combination with a circuitous trough for a disinfecting solution, of means for forcing the solution through said trough, oppositely-disposed conveyers separated from each other, and means for moving said conveyers in reverse directions.

6. In a device for dipping sheep, the combination with a circuitous trough for a disinfecting solution, of a propeller-wheel arranged in said trough for forcing the solution around said trough, oppositely-disposed conveyers separated from each other, and means for moving said conveyers in reverse directions.

7. In a device for dipping sheep, the combination with a circuitous trough for a disinfecting solution, of suitable platforms, a conveyer at one end of each platform, and means for moving said conveyers in reverse directions.

8. In a device for dipping sheep, the combination with a circuitous trough for a disinfecting solution, means for forcing the solution through said trough, carriers for conveying the sheep into and out of the trough and extending far enough into said trough to cause an upward eddy of the solution as it passes between said carriers, and means for moving said carriers in reverse directions.

In witness whereof I have hereunto subscribed my name in the presence of two witnesses.

RALPH J. WINNIE.

Witnesses:
 EDWIN B. H. TAVER, Jr.,
 C. B. CAMP.